United States Patent [19]
Do

[11] Patent Number: 5,422,677
[45] Date of Patent: Jun. 6, 1995

[54] APPARATUS AND METHOD FOR PROCESSING A PICTURE-IN-PICTURE VIDEO SIGNAL

[75] Inventor: Young S. Do, Suwon, Rep. of Korea

[73] Assignee: Samsung Electronics Co., Ltd., Kyungki-do, Rep. of Korea

[21] Appl. No.: 111,498

[22] Filed: Aug. 25, 1993

[30] Foreign Application Priority Data

Aug. 25, 1992 [KR] Rep. of Korea ............... 92-15333

[51] Int. Cl.⁶ .......................................... H04N 5/45
[52] U.S. Cl. ................................. 348/568; 348/565
[58] Field of Search ......................... 348/565–568; H04N 5/45

[56] References Cited

U.S. PATENT DOCUMENTS

| | | | |
|---|---|---|---|
| 4,249,213 | 2/1981 | Imaide et al. | 348/567 X |
| 4,399,462 | 8/1983 | Baldpole et al. | 348/568 X |
| 4,656,516 | 4/1987 | Fling et al. | 348/567 X |
| 4,796,089 | 1/1989 | Imai et al. | 348/567 X |
| 5,208,660 | 5/1993 | Yoshida | 348/567 X |

Primary Examiner—James J. Groody
Assistant Examiner—Cheryl Cohen
Attorney, Agent, or Firm—Sughrue, Mion, Zinn, Macpeak & Seas

[57] ABSTRACT

The present invention relates to an apparatus and method for processing a picture-in-picture video signal for PIP display of a compressed sub-picture displayed within a main picture on advanced TV receivers. More particularly, the present invention relates to the apparatus and method for processing a PIP video signal of advanced TV systems which use real video data lines, as opposed to artificially generated lines of video data, as the interleaving line to interleave the present field being compressed, when vertically compressing a sub-picture video signal. Accordingly, the present invention provides a hardware of simple constitution and a PIP display with advanced resolution.

7 Claims, 3 Drawing Sheets

SIGNAL $V_2$ PRIOR TO COMPRESSION

HORIZONTALLY COMPRESSED SIGNAL

VERTICALLY AND HORIZONTALLY COMPRESSED SIGNAL $V_3$

APPARATUS AND METHOD FOR PROCESSING A PICTURE-IN-PICTURE VIDEO SIGNAL

BACKGROUND OF THE INVENTION

The present invention relates to an apparatus and method for processing a Picture-In-Picture (hereinafter "PIP") video signal, and more particularly to an apparatus and method for enhancing resolution of PIP displays on advanced TV receivers offering high definition and other enhanced display formats.

Generally, the PIP function, which is one of several available display functions on TV receivers, results in a sub-picture being displayed along with a main picture in the main picture area of the TV receiver. The sub-picture is vertically and horizontally compressed and displayed simultaneously with the main picture. In a conventional PIP function, a sub-picture video signal is displayed in one-third form that is compressed vertically and horizontally.

FIG. 1 is a block diagram illustrating an example of a conventional PIP processing apparatus. The conventional PIP apparatus includes an A/D converter 11, in which analog data of a sub-picture video signal $V_2$ to be displayed simultaneously within the main picture is received and converted to a digital signal. A field memory 12 compresses vertically and horizontally the sub-picture video signal, which is input from the A/D converter 11, at a predetermined rate under the control of a controller 14. A D/A converter 13 converts a digital signal input from the field memory 12 to an analog signal and supplies the converted signal to a composite processor 15. The composite processor 15 processes a main-picture video signal $V_1$ and a compressed sub-picture video signal and supplies the resulting composite signal $V_{PIP}$ to a display unit 16.

FIG. 2 is a view showing picture states, provided in order to explain the process used by the device of FIG. 1 for compressing a picture. It is based on a NTSC system having 525 interlaced scanning lines.

First, the sub-picture video signal $V_2$ is input to the A/D converter 11. In the sub-picture video signal $V_2$, prior to compression, as shown in FIG. 2A, a field has 262.5 vertical scanning lines, each one of which has a horizontal synchronization (sync) of 63.5 μs. The A/D converter 11 converts an analog video signal of the sub-picture to a digital signal and supplies the converted signal to the field memory 12 one field at a time. Then, the controller 14 supplies a predetermined write clock $CK_W$ to the field memory 12. The field memory 12 stores the digital signal input in conformance with the write clock $CK_W$. Field data stored in the field memory 12 is read out in conformance with a read clock $CK_R$ input from the controller 14 and is supplied to the D/A converter 13. The read clock $CK_R$ generated by the controller 14 is three times as fast as the write clock $CK_W$. The video signal read from the field memory 12, shown in FIG. 2B, therefore has a form horizontally compressed to one-third size. In addition, the controller 14 reads out lines corresponding to every third line of each field stored in the field memory 12. That is, the controller 14 reads out only lines "1, 4, 7, ... " from among the lines "1, 2, 3, ... , 262.5" corresponding to each field. Therefore, the sub-picture video signal, as shown in FIG. 2C, is also compressed vertically to one-third size. Alternatively, it is possible to read out all stored lines after storing only every third line in the field memory 12. Thereafter, a compressed sub-picture video signal $V_3$ is supplied to an input terminal of the composite processor 15. The composite processor 15 composes a composite picture $V_{PIP}$ from the main-picture video signal $V_1$ and the compressed sub-picture video signal $V_3$ and outputs the composite signal $V_{PIP}$. The composite signal $V_{PIP}$ output from the composite processor 15 is supplied to a display unit 16 and displayed on a TV receiver in a PIP form, such that the sub-picture is inserted into a particular portion of the main picture.

However, advanced systems, which scan progressively a video signal such as ED-TV, HD-TV etc., include the insertion of other scanning lines between lines. In general, a PIP display for advanced TV systems employs two methods. FIG. 3 is a schematic view for illustrating such conventional line interleaving methods. According to a first method, when the lines are read from the field memory, a line located in a position preceding the present interleaving line is read once more from the field memory, and used as the interleaving line to interleave the present field being compressed. Alternatively, one field of the sub-picture signal is additionally stored in the memory, and the line of the additionally stored field, the position of which is the same as the interleaving position of the present field, is read from the memory and used as the interleaving line to interleave the present field being compressed.

The interleaving line in the conventional PIP system is artificial data, not real video data. Therefore, several limitations arise to enhancing vertical resolution. In addition, the need arises for a line memory, field memory, control circuitry, and so on, in order to embody hardware for processing the interleaving signal. As a result, problems with expensive costs are encountered due to complexity of the circuitry system.

SUMMARY OF THE INVENTION

Therefore, to solve the above problems, it is an object of the present invention to provide a method for processing a PIP video signal in order to obtain an advanced resolution of PIP display, using a real, as opposed to an artificial or compressed, video signal as an interleaving signal when pictures are vertically compressed in PIP circuits for advanced TV systems.

It is another object of the present invention to provide a circuit for vertically compressing a video signal, in which the video signal is compressed vertically according to an improved method.

It is a further object of the present invention to provide an apparatus for processing a PIP video signal for advanced TV systems, which apparatus has hardware of simple constitution and further has an advanced resolution PIP display, whereby the apparatus uses a circuit for vertical compression in accordance with the present invention.

The above and other objects are accomplished by an apparatus for processing a PIP video signal in accordance with the present invention. The apparatus comprises a memory for storing a sub-picture signal and reading the stored signal; a vertical compressing unit synchronized with a horizontal sync signal of the sub-picture signal and for controlling the memory to store lines of the sub-picture signal by units of two subsequent lines and to not store an incoming line of the two lines; a controller for inputting to the memory a predetermined write clock and a read clock, the read clock being faster than the write clock, in a ratio given by the amount that the sub-picture is horizontally compressed; and a composite processor for composing the compressed sub-picture signal read from the memory in conformity to a main-picture video signal and the read clock.

Other features of the present invention are achieved by a circuit for vertical compression of a video signal, wherein the circuit comprises a field memory for storing and reading the video signal in field units, and a vertical compressing unit for synchronizing with a horizontal sync signal of the video signal and controlling the memory to store the lines of the video signal in units of two subsequent lines and to not store an incoming line of the two lines.

The present invention further provides a method for processing a PIP video signal for simultaneously displaying a sub-picture within a main picture. The method comprises the steps of converting the sub-picture signal to digital data; storing only two subsequent lines of three lines of the data in a memory according to a predetermined write clock; repeating the storing in units of three lines of the sub-picture signal; reading data stored in the field memory according to a read clock which is faster than the write clock and in a ratio given by the desired horizontal compression of the sub-picture; converting the read data to an analog signal and generating a compressed sub-picture signal; and composing a composite of the main-picture signal and compressed the sub-picture signal.

BRIEF DESCRIPTION OF THE DRAWINGS

The objects and features of the present invention will become more apparent from the consideration of the following detailed description taken in conjunction with the accompanying drawings in which.

DETAILED DESCRIPTION OF THE PREFERRED EMBODIMENTS

Preferred embodiments of the present invention will be described below in more detail with reference to the accompanying drawings.

Figure 1:
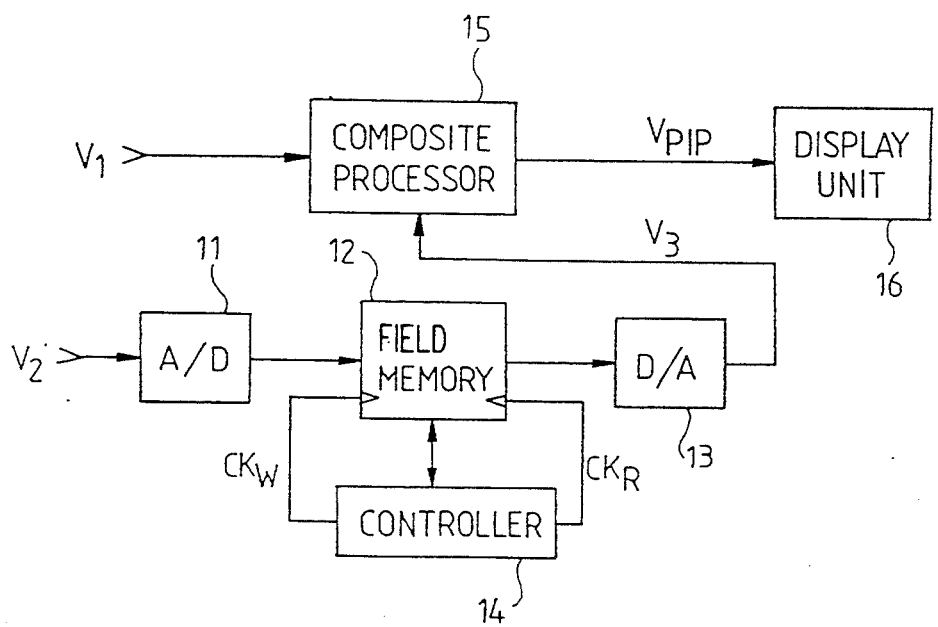
FIG. 1 is a block diagram illustrating an example of a conventional PIP processing apparatus.
Figure 2A:
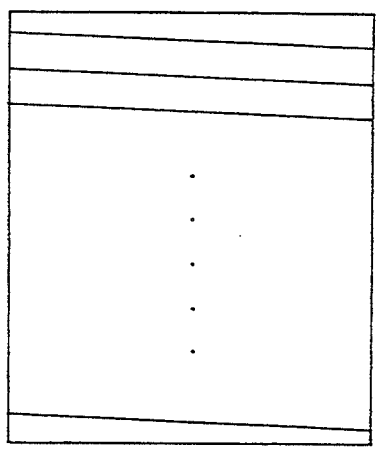
FIGS. 2A to 2C are views showing picture states in order to explain the process of compressing a picture in the device of FIG. 1.
Figure 2B:
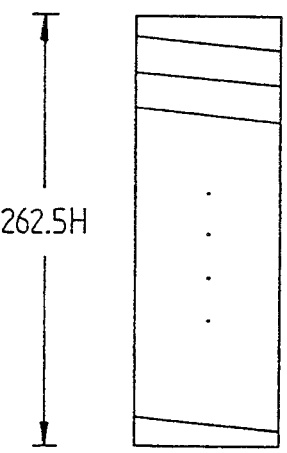
Figure 2C:
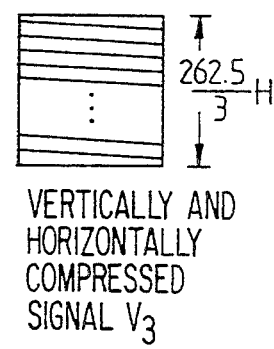
Figure 3:
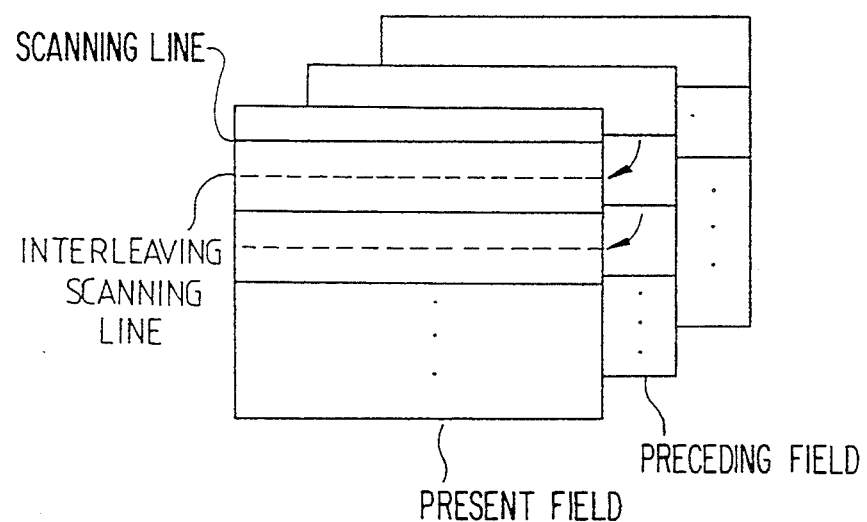
FIG. 3 is a schematic view for illustrating a conventional line interleaving method.
Figure 4:
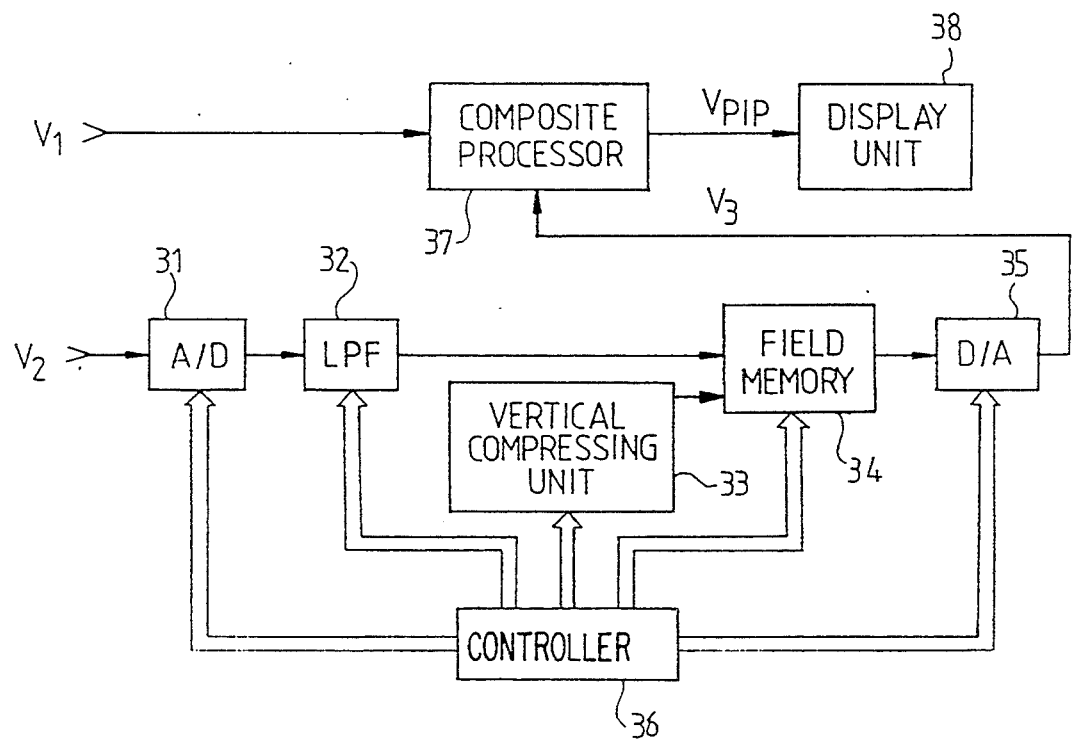
FIG. 4 is a block diagram illustrating a preferred embodiment of an apparatus for processing a PIP video signal according to the present invention.

FIG. 4 illustrates a preferred embodiment of an apparatus for processing a PIP video signal according to the present invention. The processing apparatus comprises an A/D converter 31 which converts a sub-picture video signal $V_2$ to a digital signal. The A/D converter 31 is connected with a low pass filter (LPF) 32. The LPF 32 low-pass-filters the digitized video signal $V_2$ in order to prevent the aliasing of the vertical frequency, in the case of the vertical copressing of the sub-picture. An output signal of the LPF 32 is selectively supplied to a field memory 34. The vertical compressing unit 33 will be described in detail in conjunction with FIGS. 5 and 6. The sub-picture video signal vertically compressed in accordance with the vertical compressing unit 33 is stored in the field memory 34. Then, a controller 36 generates a predetermined write clock $CK_W$ and the field memory 34 stores video data in conformance with the write clock $CK_W$. The video data stored in the field memory 34 is read according to a predetermined read clock $CK_R$ from the controller 36 and input to a D/A converter 35. The controller 36 generates the read clock $CK_R$ three times as fast as the write clock $CK_W$. Therefore, the video data stored in the field memory 34 is compressed horizontally by a factor of three. Therefore, the sub-picture video signal, which is supplied from the field memory 34 to the D/A converter 35, is the one-third video signal $V_3$ which is compressed vertically and horizontally. The one-third of the compressed sub-picture video signal $V_3$ is converted to an analog signal in the D/A converter 35 and supplied to a composite processor 37. The composite processor 37 composes a signal $V_{PIP}$ from a main-picture video signal $V_1$ supplied from another input terminal and from the compressed sub-picture video signal $V_3$, input from the D/A converter 35, and outputs the PIP video signal $V_{PIP}$. The PIP video signal $V_{PIP}$ is input to a display unit 38, whereby a picture-in-picture display having the compressed sub-picture within the main picture on the screen is obtained.

Figure 5:
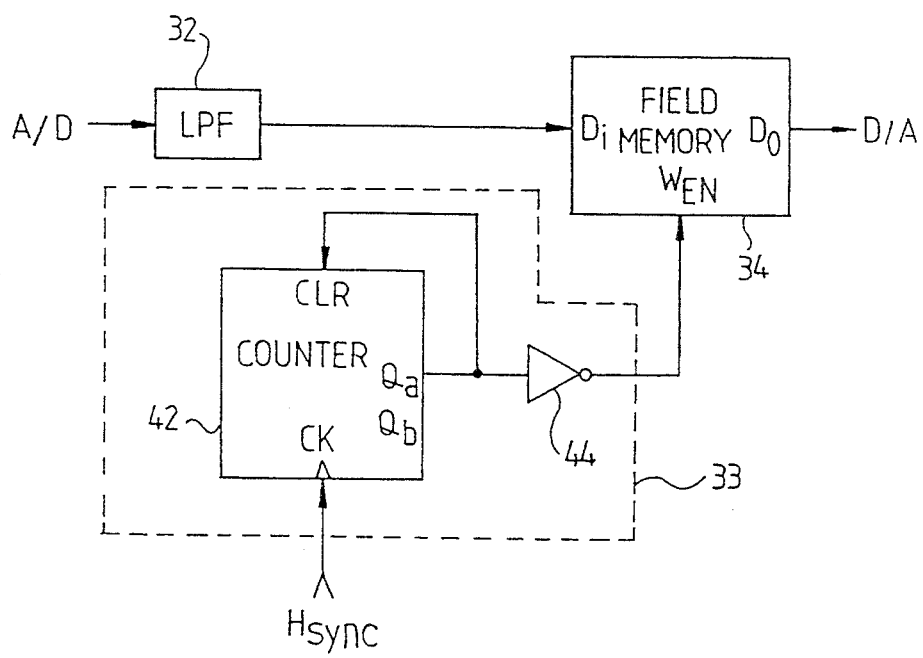
FIG. 5 is a detailed view of the vertical compressing unit of FIG. 4.
Figure 6:
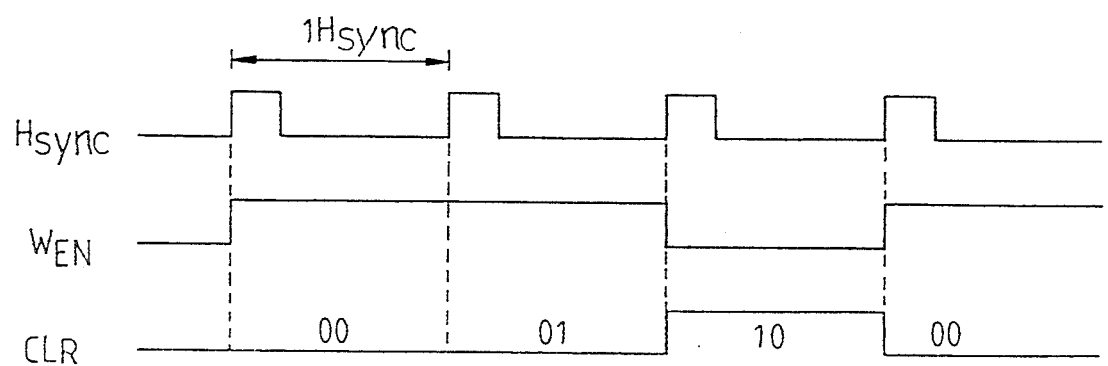
FIG. 6 is a waveform diagram illustrating signals referenced in FIG. 5.

FIG. 5 is a detailed view concerning the vertical compressing unit of FIG. 4, and FIG. 6 is a waveform diagram showing signals referenced in FIG. 5. The vertical compressing unit 33 includes a binary counter 42 which synchronizes with a horizontal sync signal ($H_{sync}$) and counts the horizontal sync signals ($H_{sync}$). The unit 33 further includes an inverter 44 which is connected between an output terminal Qa of the binary counter 42 and a write enable terminal $W_{EN}$ of the field memory 34. The counter 42 is synchronized with the horizontal sync signal ($H_{sync}$) and counts sequentially "00, 01, 10" and outputs the result. An output signal from the output terminal Qa having a particular binary value (e.g., $2^1$ place) is fed back to a clear terminal CLR of the counter 42. Then, when the output value of the output terminal Qa becomes, e.g., high ("1"), the counter 42 is reset. When the output of the counter 42 is "00" or "01" the field memory 34 is in a write enable state. Then, the video signal output from the LPF 32 is stored in the field memory 34 during such write enable periods. On the other hand, when the output of the counter 42 is "10", the counter 42 is reset and the field memory 34 is in a write disable state. Thus, the video signal for a period of one scanning line output from the LPF 32 is not stored in the field memory 34.

Accordingly, when a write operation of the field memory 34 is repeatedly controlled by the binary counter 42, the field memory 34 stores only lines "1, 2, 4, 5, 7, 8, ... 262". Here, lines "1, 4, 7, ... " of the video signal correspond to a vertically compressed video signal, and lines "2, 5, 8, ... " correspond to the interleaving signal.

According to the embodiment of FIG. 5, lines "2, 5, 8, ... " are chosen as the interleaving signal, using the binary counter 42; however, other lines can be used as the interleaving signal. Thus, as an alternative, if a NTSC signal, in which one field has 262.5 lines, is vertically compressed, "3, 6, 9, ... " among lines "2, 3, 5, 6, 8, 9, ... " can be used as the interleaving signal.

As described above, in compressing a sub-picture, an apparatus and method for processing a PIP video signal for advanced TV systems in accordance with the present invention use a real, as opposed to an artifical, compressed video signal as the interleaving signal. Accordingly, the present invention provides hardware of simple constitution and PIP display with advanced resolution.

What is claimed is:

1. An apparatus for processing a picture-in-picture (PIP) video signal, the apparatus comprising:

a memory for storing a sub-picture signal and reading out the stored sub-picture signal;

a vertical compressing unit for receiving a horizontal synchronizing signal synchronized with the sub-picture signal and for controlling said memory to store lines of the sub-picture signal by units of two subsequent lines and to not store an associated line of the two lines;

a controller for inputting to said memory a predetermined write clock and a read clock, the read clock having a speed faster than the write clock, in a ratio proportional to the horizontal compression of the sub-picture; and a composite processor for composing the compressed sub-picture signal read from said memory in conformity to the video signal of a main picture and the read clock;

wherein said vertical compressing unit comprises a binary counter for synchronizing with the horizontal synchronization signal of the sub-picture signal and counting the horizontal synchronization signal, said counter being reset when a binary counting value reaches a predetermined value; and an inverter, connected between an output terminal of said binary counter and a write enable terminal of said memory, for inverting an output value of said binary counter.

2. The apparatus for processing a PIP video signal according to claim 1, further comprising an A/D converter for converting the sub-picture signal to a digital signal and inputting the converted signal to said memory.

3. The apparatus for processing a PIP video signal according to claim 2, further comprising a low pass filter coupled between said A/D converter and said memory, for preventing aliasing of a vertical frequency of the sub-picture signal.

4. The apparatus for processing a PIP video signal according to claim 2, wherein a D/A converter, connected between said memory and said composite processor, converts digital data read from said memory into an analog signal.

5. The apparatus for processing a PIP video signal according to claim 1, wherein said memory is a field memory for storing the sub-picture data in field units.

6. The apparatus for processing a PIP video signal according to claim 1, wherein said apparatus is incorporated in a television unit employing high definition signal processing.

7. A circuit for vertical compression of a video signal, the circuit comprising:

a field memory for storing and reading the video signal in field units; and a vertical compressing unit for synchronizing with a horizontal synchronization signal of the video signal and repeatedly controlling said field memory to store the lines of the video signal in units of two subsequent lines and to not store a line related to the two lines stored;

wherein said vertical compressing unit further comprises a binary counter for counting the horizontal synchronization signal, said counter being reset when a binary counting value attains a given value; and an inverter, connected between an output terminal of said binary counter and a write enable terminal of said field memory, for inverting an output value of said binary counter.

* * * * *